(12) United States Patent
Lin et al.

(10) Patent No.: US 6,227,631 B1
(45) Date of Patent: May 8, 2001

(54) COMPUTER ENCLOSURE

(75) Inventors: Wan-Cheng Lin, Pen-Chiao (TW); Li-Yuan Gan, Cheng-Do (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/410,108

(22) Filed: Sep. 30, 1999

(30) Foreign Application Priority Data

Oct. 23, 1998 (TW) ................................................ 87217621

(51) Int. Cl.[7] .................................................... A47B 81/00
(52) U.S. Cl. ........................................ 312/223.2; 312/351
(58) Field of Search ............................ 312/223.1, 223.2, 312/334.4, 330.1, 350, 351, 334.14; 108/109, 110; 361/683, 684, 685, 724, 725, 726, 727; 248/637, 346.01

(56) References Cited

U.S. PATENT DOCUMENTS

| | | | |
|---|---|---|---|
| 5,564,804 | * 10/1996 | Gonzalez et al. | ................. 312/223.2 |
| 5,721,669 | * 2/1998 | Becker et al. | ........................ 361/685 |
| 5,768,099 | * 6/1998 | Radloff et al. | ........................ 361/685 |
| 6,015,196 | * 1/2000 | Welch et al. | ....................... 312/223.2 |
| 6,025,987 | * 2/2000 | Allirot et al. | ......................... 361/685 |
| 6,058,007 | * 5/2000 | Eckert et al. | ..................... 361/685 X |
| 6,069,789 | * 5/2000 | Jung | .............................. 312/223.2 X |
| 6,088,222 | * 7/2000 | Schmitt et al. | ................ 312/332.1 X |

* cited by examiner

*Primary Examiner*—Peter M. Cuomo
*Assistant Examiner*—Hanh V. Tran
(74) *Attorney, Agent, or Firm*—Wei Te Chung

(57) ABSTRACT

A computer enclosure includes a front panel, a receiving cage mounted to the front panel and a drive bracket received and retained in the receiving cage. The drive bracket has a base, a pair of side walls extending from opposite edges of the base and a front wall extending between the side walls. A pair of ledges is formed between the side walls of the drive bracket for receiving a data storage device therebetween. The drive bracket allows a data storage device of a small size to be received and retained in the receiving cage.

16 Claims, 4 Drawing Sheets

COMPUTER ENCLOSURE

BACKGROUND OF THE INVENTION

1. Field of the Invention

The present invention relates to a computer enclosure, and particularly to a computer enclosure incorporating a drive bracket for receiving and retaining a small-sized data storage device in the computer enclosure.

2. The Related Art

A data storage device, such as a floppy disk drive (FDD) or CD-ROM drive, is normally mounted in a computer enclosure proximate a front side thereof. The computer enclosure forms an opening in the front side thereof for facilitating access to the data storage device. Referring to FIG. 1 of the attached drawings, a CD-ROM drive 102 with a size of 5.25 inches is received and retained in a receiving cage 104 of a computer enclosure 106 by bolts 108 extending through the receiving cage 104 and threadedly engaging with corresponding holes 110 of the CD-ROM drive 102. The receiving cage 104 has a fixed size which hinders the receiving cage 104 from receiving and retaining a data storage device of a smaller size. Thus a floppy disk drive having a size of 3.5 inches cannot be fixed in the computer enclosure 106 due to the size limitation of the receiving cage 104. The receiving cage 104 is not fully utilized.

Thus, it is desired to have a computer enclosure which is capable of receiving and retaining data storage devices of different sizes.

SUMMARY OF THE INVENTION

Accordingly, an object of the present invention is to provide a computer enclosure having a receiving cage which is capable of retaining data storage devices of different sizes by incorporating a drive bracket.

To fulfil the object mentioned above, a computer enclosure in accordance with the present invention comprises a front panel, a receiving cage mounted to the front panel and a drive bracket received and retained in the receiving cage. The drive bracket comprises a base and a pair of side walls extending from opposite edges of the base. A pair of ledges is formed between the side walls of the drive bracket for receiving a data storage device therebetween. The drive bracket allows a data storage device of a small size to be received and retained in the receiving cage.

Other objects and advantages of the present invention will be understood from the following description of a computer enclosure according to a preferred embodiment of the present invention.

DETAILED DESCRIPTION OF THE PREFERRED EMBODIMENT

Figure 1:
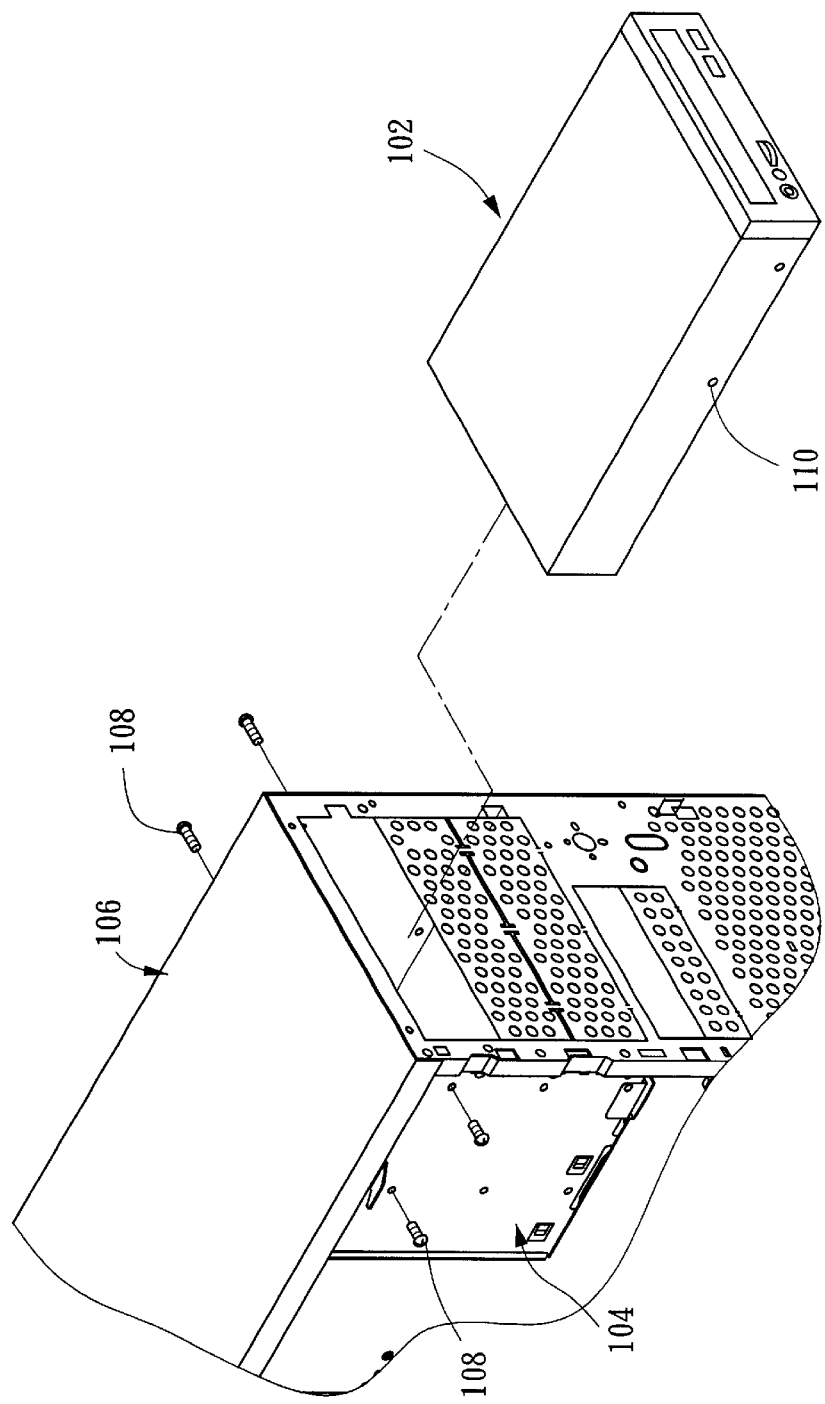
FIG. 1 is a perspective view of a conventional computer enclosure and a data storage device to be mounted thereto.
Figure 2:
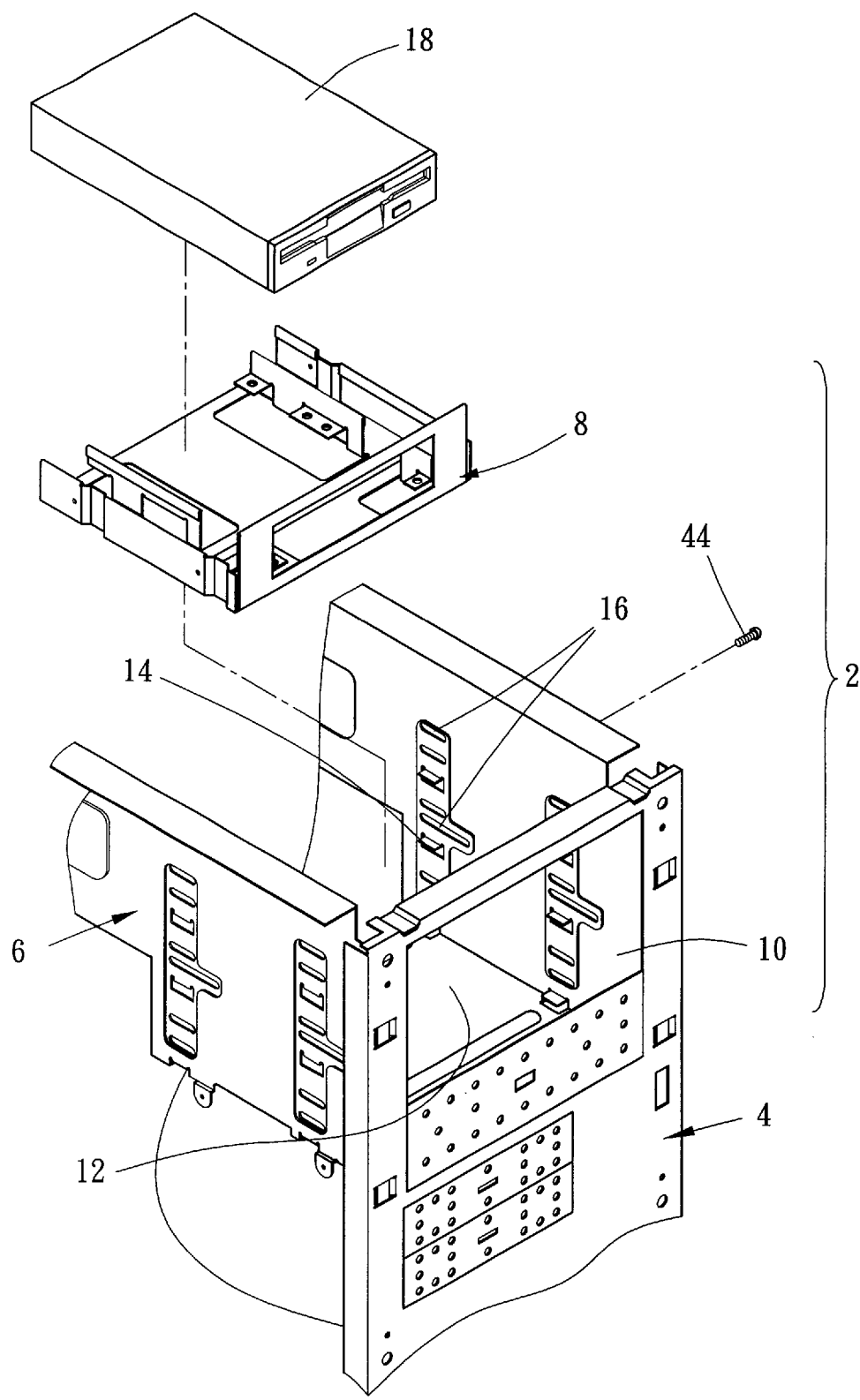
FIG. 2 is an exploded view of a computer enclosure of the present invention showing a small sized data storage device is to be mounted to a receiving.
Figure 3:
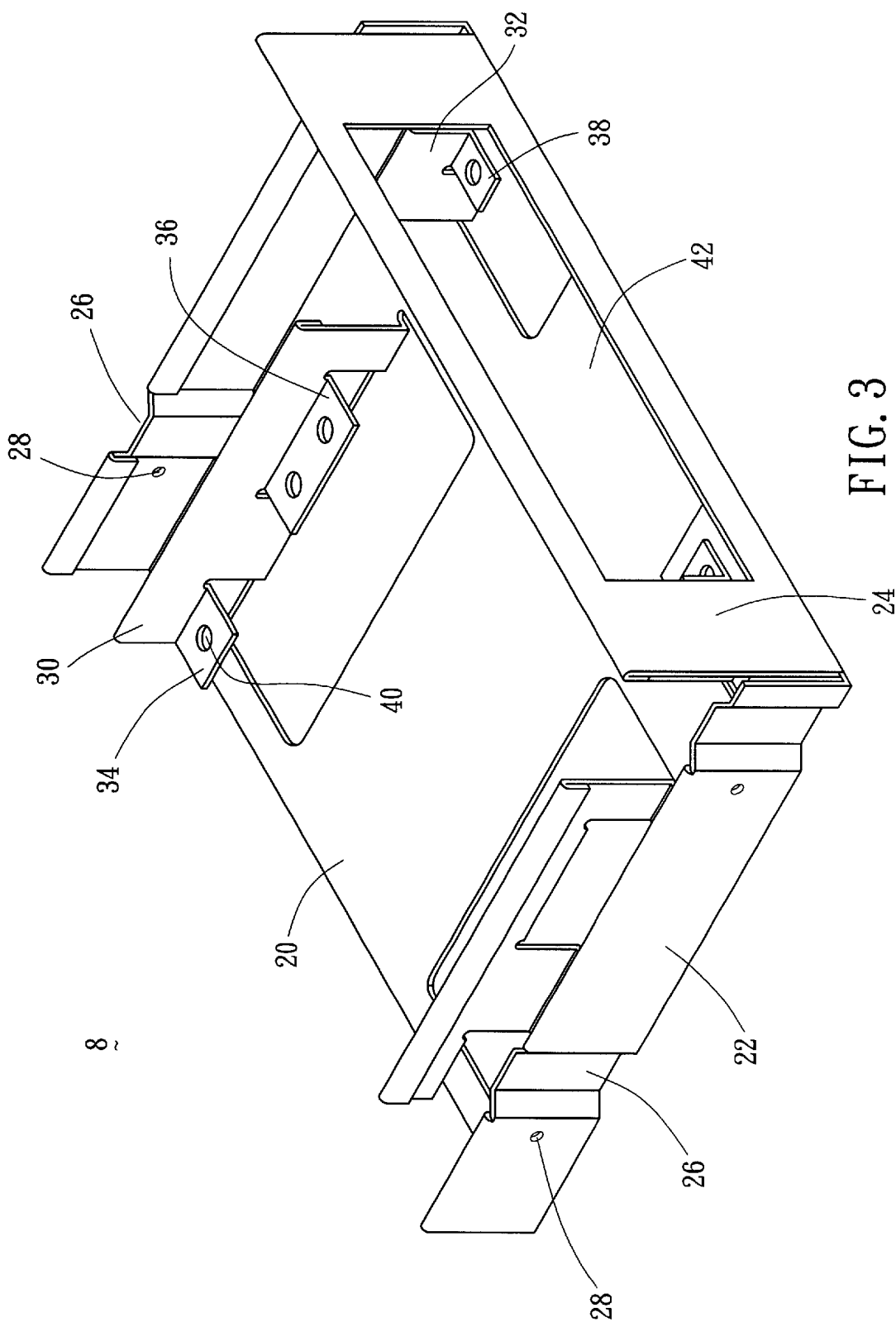
FIG. 3 is a perspective view of a drive bracket of the present invention.

Referring to FIGS. 2 and 3, a computer enclosure 2 in accordance with the present invention includes a front panel 4, a receiving cage 6 attached to the front panel 4 and a drive bracket 8 received in the receiving cage 6. The front panel 4 defines an opening 10. The receiving cage 6 is U-shaped and defines a receiving space 12 in communication with the opening 10 of the front panel 4. The receiving cage 6 has opposite side walls (not labeled) each forming at least two pairs of tabs 14 projecting into the receiving space 12. A pair of elongate apertures 16 is defined above each pair of tabs 14 in each side wall of the receiving cage 6. A CD-ROM drive or a floppy disk drive with a size of 5.25 inches may be snugly received between the side walls of the receiving cage 6 and supported by corresponding tabs 14. The CD-ROM drive or floppy disk drive is accessible through the opening 10 of the front panel 4.

In accordance with the present invention, a drive bracket 8 is selectively received between the side walls of the receiving cage 6 by replacing the CD-ROM drive or the floppy disk drive. The drive bracket 8 receives a floppy disk drive 18 with a size of 3.5 inches. Thus, the receiving cage 6 can receive and retain data storage devices of different sizes by means of the drive bracket 8.

The drive bracket 8 comprises a base 20, opposite side walls 22 extending from opposite edges of the base 20 and a front wall 24 extending from a front edge of the base 20 and between the, side walls 22. Each side wall 22 forms a pair of recesses 26 toward an inner surface thereof and a pair of holes 28 therethrough. A pair of first and second ledges 30, 32 is formed between the side walls 22 and defines a space therebetween for receiving the floppy disk drive 18. The left-side first ledge 30 forms first and second plates 34, 36 extending toward another ones of the right-side ledge 30. Each second ledge 32 forms a third plate 38, also extending toward each other. The first, second and third plates 34, 36, 38 are arranged at the same height. The first and third plates 34,38 each define a fixing holes 40 and the second plate 36 defines two fixing holes 40 for securing the floppy disk drive 18 by bolts (not shown).

Figure 5:
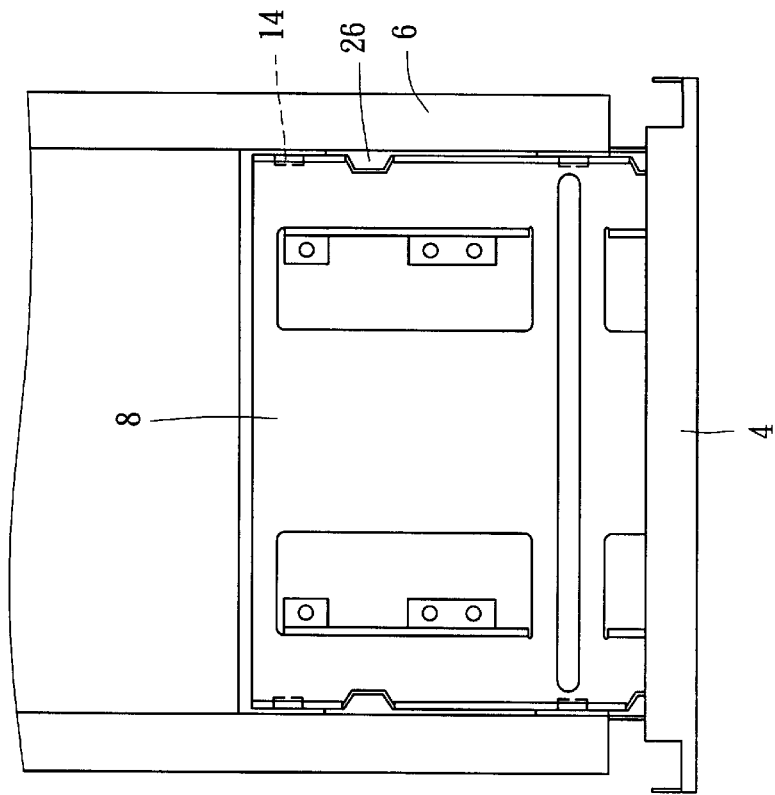
FIG. 5 is similar to FIG. 4 but shows the tabs of the receiving cage abutting against the bottom surface of the drive bracket.
Figure 4:
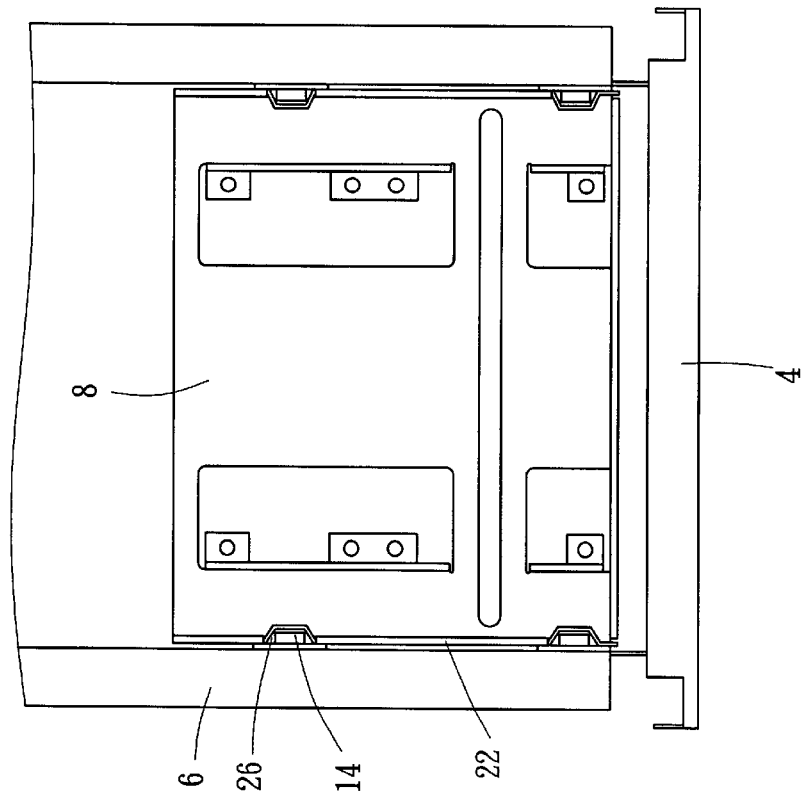
FIG. 4 is a top plan view of the computer enclosure showing the recesses of the drive bracket and the tabs of the receiving cage, wherein the tabs are being got through the recesses.

Referring to FIGS. 4 and 5, in assembly, the drive bracket 8 is inserted into the receiving cage 6 from the top of the receiving cage 6 with the recesses 26 of the side walls 22 of the drive bracket 8 accommodating passage of the corresponding tabs 14 of the side walls of the receiving cage 6. The drive bracket 8 is moved toward the front panel 4 with corresponding tabs 14 of the bracket 6 abutting against the base 20 of the drive bracket 8 at positions offset from the recesses 26 to support the drive bracket 8. Two pairs of bolts 44 (FIG. 2) extend through the elongate apertures 16 of the receiving cage 6 and threadedly engage with the holes 28 of the drive bracket 8 thereby securing the drive bracket 8 between the side walls of the receiving cage 6.

It will be understood that the present invention may be embodied in other forms without departing from the spirit thereof. The present example and embodiment, therefore, is to be considered in all respects as illustrative and not restrictive, and the invention is not to be limited to the details given herein.

What is claimed is:

1. A computer enclosure comprising:

a receiving cage; and a drive bracket selectively received and releasably retained in the receiving cage in place of a data storage device of a first size for accommodating a data storage device of a second size smaller than the first size, the drive bracket comprising:
a base; and
a pair of side walls extending from opposite edges of the base for securely engaging with the receiving cage, a pair of ledges extending perpendicularly from the base between the side walls of the drive bracket and adapted to receive and retain the data storage device of second size therebetween, and a plate extending from each said ledge toward each other and defining a fixing hole for receiving a fastener to secure the data storage device.

2. The computer enclosure as described in claim 1, wherein the drive bracket comprises a front wall extending between the side walls thereof.

3. The computer enclosure as described in claim 1, wherein each side wall of the drive bracket forms a pair of recesses toward an inner surface thereof.

4. The computer enclosure as described in claim 1, wherein the receiving cage has opposite side walls each forming at least a tab projecting toward each other for supporting the drive bracket.

5. The computer enclosure as claimed in claim 4, wherein each side wall of the receiving cage forms a pair of tabs for firmly supporting the drive bracket.

6. The computer enclosure as described in claim 4, wherein at least one elongate aperture is defined above the tab in each side wall of the receiving cage adapted to receive a fastener to secure the drive bracket to the receiving cage.

7. A computer enclosure comprising:
a receiving cage forming two tabs at different levels at each side wall thereof; and
a drive bracket selectively received and releasably retained in the receiving cage in place of a data storage device of a first size for accommodating a data storage device of a second size smaller than the first size, the drive bracket comprising:
a base; and
a pair of side walls extending from opposite edges of the base for securely engaging with the receiving cage, a space between the side walls being adapted to receive and retain the data storage device of second size, each side wall of the drive bracket forming a recess through which a first level tab of the receiving cage passes when moving the drive bracket to a second level.

8. The computer enclosure as described in claim 7, wherein a pair of ledges is formed between the side walls of the drive bracket.

9. The computer enclosure as described in claim 8, wherein each ledge forms a plate extending toward each other for supporting the data storage device.

10. The computer enclosure as described in claim 9, wherein each plate defines at least a fixing hole for receiving a fastener to secure the data storage device.

11. The computer enclosure as described in claim 7, wherein the drive bracket comprises a front wall extending between the side walls thereof.

12. The computer enclosure as claimed in claim 7, wherein each side wall of the receiving cage forms two pairs of tabs at different levels for firmly supporting the drive bracket.

13. The computer enclosure as described in claim 12, wherein at least one elongate aperture is defined above the tab in each side wall of the receiving cage adapted to receive a fastener to secure the drive bracket to the receiving cage.

14. A method for assembling a computer enclosure, comprising the steps of:
providing a receiving cage defining upper and lower pairs of supporting tabs, each pair of supporting tabs extending toward each other from two opposite first side walls thereof;
providing a drive bracket with a smaller data storage device thereon, said drive bracket including a base with a pair of second side walls respectively extending from two opposite edges of the base; and
downwardly loading the drive bracket into the receiving cage from a top portion of the receiving cage without interfering with the upper pair of supporting tabs, and successively horizontally moving the drive bracket forwardly under the condition that the base of the drive bracket is supportably slidably positioned on the lower pair of supporting tabs.

15. The method as claimed in described 14, wherein an elongated aperture is formed in one of said first and second side walls, and a hole is formed in the other of said first and second side walls so that the drive bracket can be adjustably moved in a front-to-back direction with regard to the receiving cage and retained to the receiving cage by a bolt extending through both the elongated aperture and the hole when the drive bracket reaches a final position.

16. A computer enclosure comprising:
a receiving cage forming two tabs at different levels at each side wall thereof; and
a drive bracket selectively received and releasably retained in the receiving cage in place of a data storage device of a first size for accommodating a data storage device of a second size smaller than the first size, the drive bracket comprising:
a base; and
a pair of side walls extending from opposite edges of the base, a pair of ledges extending perpendicularly from the base between the side walls of the drive bracket and adapted to receive and retain the data storage device of second size therebetween, each side wall of the drive bracket forming a recess through which a first level tab of the receiving cage passes when moving the drive bracket to a second level thereby the second level tab is located beneath the base to support the drive bracket.

* * * * *